United States Patent
Yu

(10) Patent No.: US 9,836,242 B2
(45) Date of Patent: Dec. 5, 2017

(54) METHODS FOR DYNAMIC PARTITIONING AND APPARATUSES USING THE SAME

(71) Applicant: Silicon Motion, Inc., Jhubei, Hsinchu County (TW)

(72) Inventor: Da-Ru Yu, Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 10 days.

(21) Appl. No.: 15/145,676

(22) Filed: May 3, 2016

(65) Prior Publication Data

US 2017/0075621 A1    Mar. 16, 2017

(30) Foreign Application Priority Data

Sep. 11, 2015  (TW) .............................. 104130053 A

(51) Int. Cl.
*G06F 3/06*  (2006.01)

(52) U.S. Cl.
CPC .......... *G06F 3/0644* (2013.01); *G06F 3/0605* (2013.01); *G06F 3/0665* (2013.01); *G06F 3/0679* (2013.01)

(58) Field of Classification Search
CPC .... G06F 3/0644; G06F 3/0605; G06F 3/0665; G06F 3/0679
USPC ................. 711/103, 154, 156, 173, 208, 221
See application file for complete search history.

(56) References Cited

U.S. PATENT DOCUMENTS

| | | | |
|---|---|---|---|
| 8,688,894 B2* | 4/2014 | Kuehne | G06F 12/0246 711/103 |
| 9,405,700 B2* | 8/2016 | Wingard | G06F 12/1027 |
| 2009/0204748 A1 | 8/2009 | Jang et al. | |
| 2011/0055458 A1 | 3/2011 | Kuehne | |
| 2013/0279249 A1 | 10/2013 | Yun et al. | |
| 2014/0068158 A1 | 3/2014 | Cheng et al. | |

FOREIGN PATENT DOCUMENTS

TW   200937429   9/2009

* cited by examiner

*Primary Examiner* — Stephen Elmore
(74) *Attorney, Agent, or Firm* — McClure, Qualey & Rodack, LLP

(57) ABSTRACT

The invention introduces a method for dynamic partitioning, performed by a processing unit, including at least the following steps. A storage-unit ID (identifier) associated with a storage unit is acquired, where the storage unit is coupled to the processing unit. Parameters corresponding to the storage-unit ID are obtained and the length of a physical super-page is calculated according to the parameters. The length of a data buffer is obtained and the quantity of logical partitions is calculated according to the length of the physical super-page and the length of the data buffer. The quantity of logical partitions is stored in a DRAM (Dynamic Random Access Memory).

18 Claims, 8 Drawing Sheets

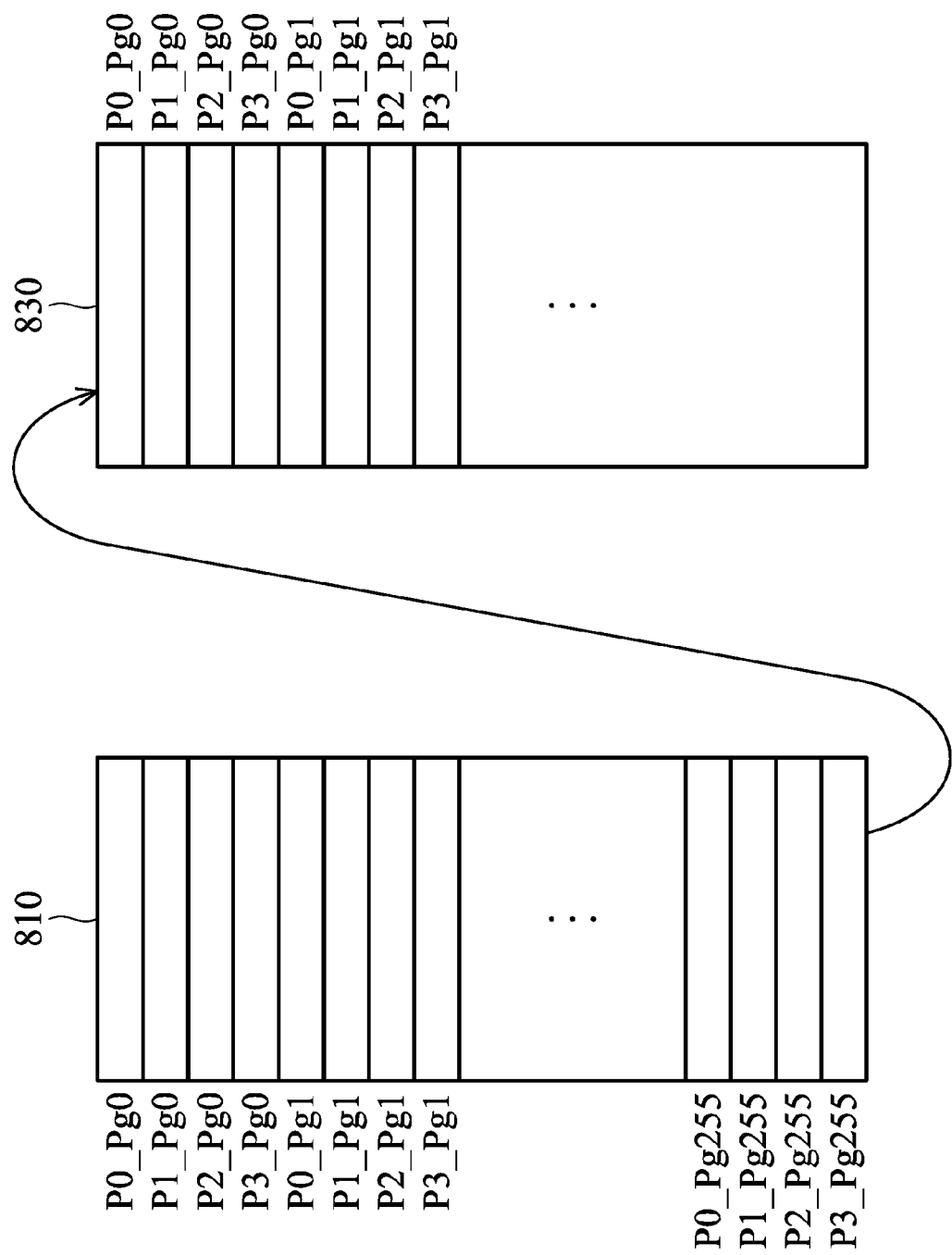

METHODS FOR DYNAMIC PARTITIONING AND APPARATUSES USING THE SAME

CROSS REFERENCE TO RELATED APPLICATIONS

This Application claims priority of Taiwan Patent Application No. 104130053, filed on Sep. 11, 2015, the entirety of which is incorporated by reference herein.

BACKGROUND

Technical Field

The present invention relates to flash memory, and in particular to methods for dynamic partitioning and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads from the memory cells and writes to the memory cells complete pages. After a page of data is read from the array into a buffer inside the device, the host can access the data bytes or words one by one by serially clocking them out using a strobe signal. Flash memory devices may be equipped with different types of storage units and the quantities of logic partitions may vary with different types of storage units. Conventionally, it is required to prepare different firmware versions in correspondence with different types of storage units. Accordingly, what is needed are methods for dynamic partitioning and apparatuses that use these methods to overcome the drawbacks listed above.

BRIEF SUMMARY

An embodiment of a method for dynamic partitioning, performed by a processing unit, is introduced to include at least the following steps. A storage-unit ID (identifier) associated with a storage unit is acquired, where the storage unit is coupled to the processing unit. Parameters corresponding to the storage-unit ID are obtained and the length of a physical super-page is calculated according to the parameters. The length of a data buffer is obtained and a quantity of logical partitions is calculated according to the length of the physical super-page and the length of the data buffer. The quantity of logical partitions is stored in a DRAM (Dynamic Random Access Memory).

An embodiment of an apparatus for dynamic partitioning is introduced to include at least an access interface and a processing unit. The access interface is coupled to a storage unit. The processing unit acquires a storage-unit ID (identifier) associated with the storage unit via the access interface, where the storage unit is coupled with the processing unit. The processing unit obtains parameters corresponding to the storage-unit ID and calculates the length of a physical super-page according to the parameters. The processing unit obtains the length of a data buffer; calculates the quantity of logical partitions according to the length of the physical super-page and the length of the data buffer; and stores the quantity of logical partitions in a DRAM.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein:

FIG. 8 is a schematic diagram for sequential reads across blocks according to an embodiment of the invention.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
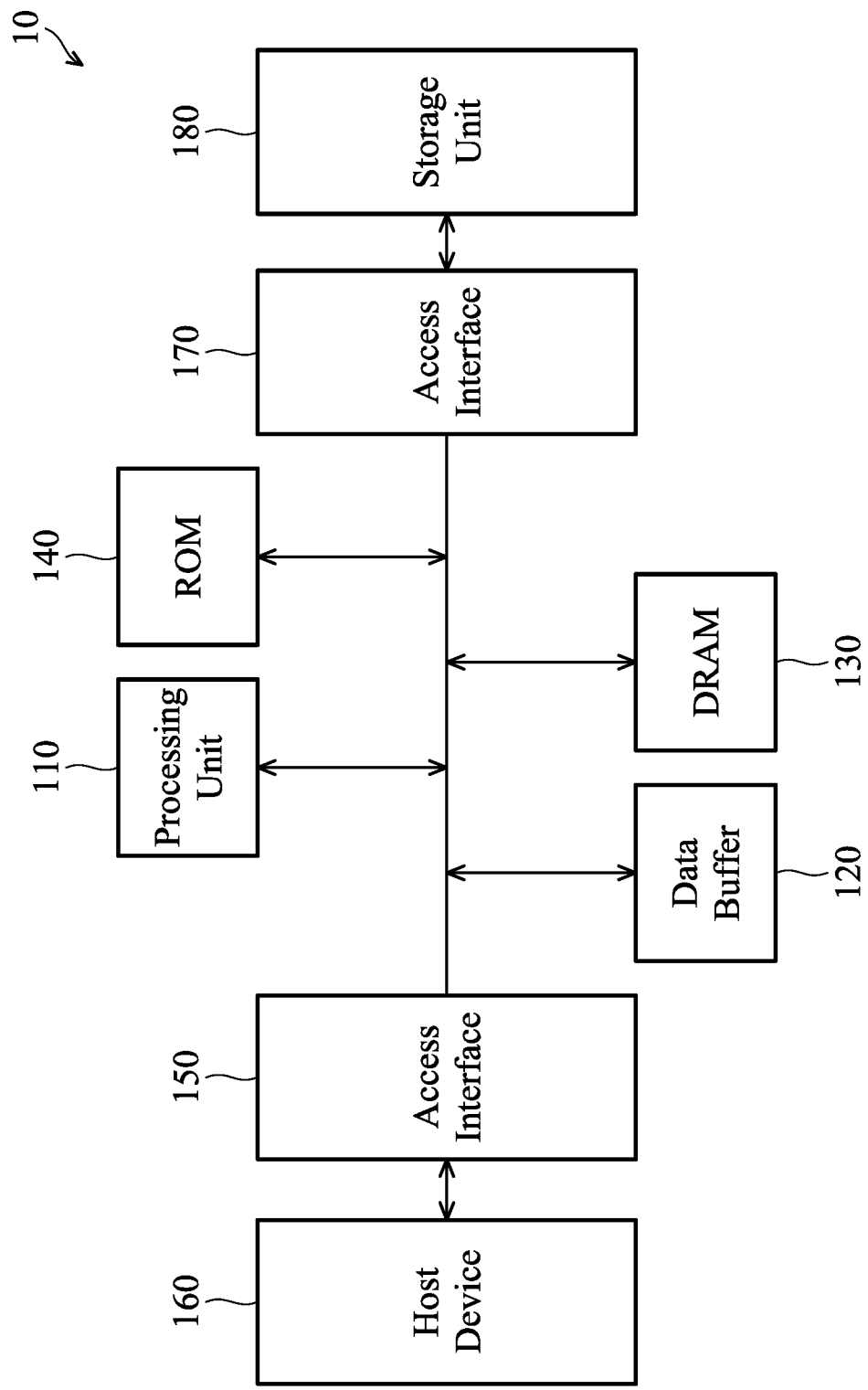
FIG. 1 is the system architecture of a flash memory according to an embodiment of the invention.

FIG. 1 is the system architecture of a flash memory according to an embodiment of the invention. The system architecture 10 of the flash memory contains a processing unit 110 being configured to write data into a designated address of a storage unit 180, and read data from a designated address thereof. Specifically, the processing unit 110 writes data into a designated address of the storage unit 180 through an access interface 170 and reads data from a designated address thereof through the same interface 170. The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, or others. The processing unit 110 may communicate with the host device 160 through an access interface 150 using a standard protocol, such as USB (Universal Serial Bus), ATA (Advanced Technology Attachment), SATA (Serial ATA), PCI-E (Peripheral Component Interconnect Express) or others. A data buffer 120 may be disposed on the flash memory to temporarily store data to be programmed into the storage unit 180 and read from the storage unit 180. The data buffer 120 may be implemented in a SRAM (Static Random Access Memory).

Figure 2:
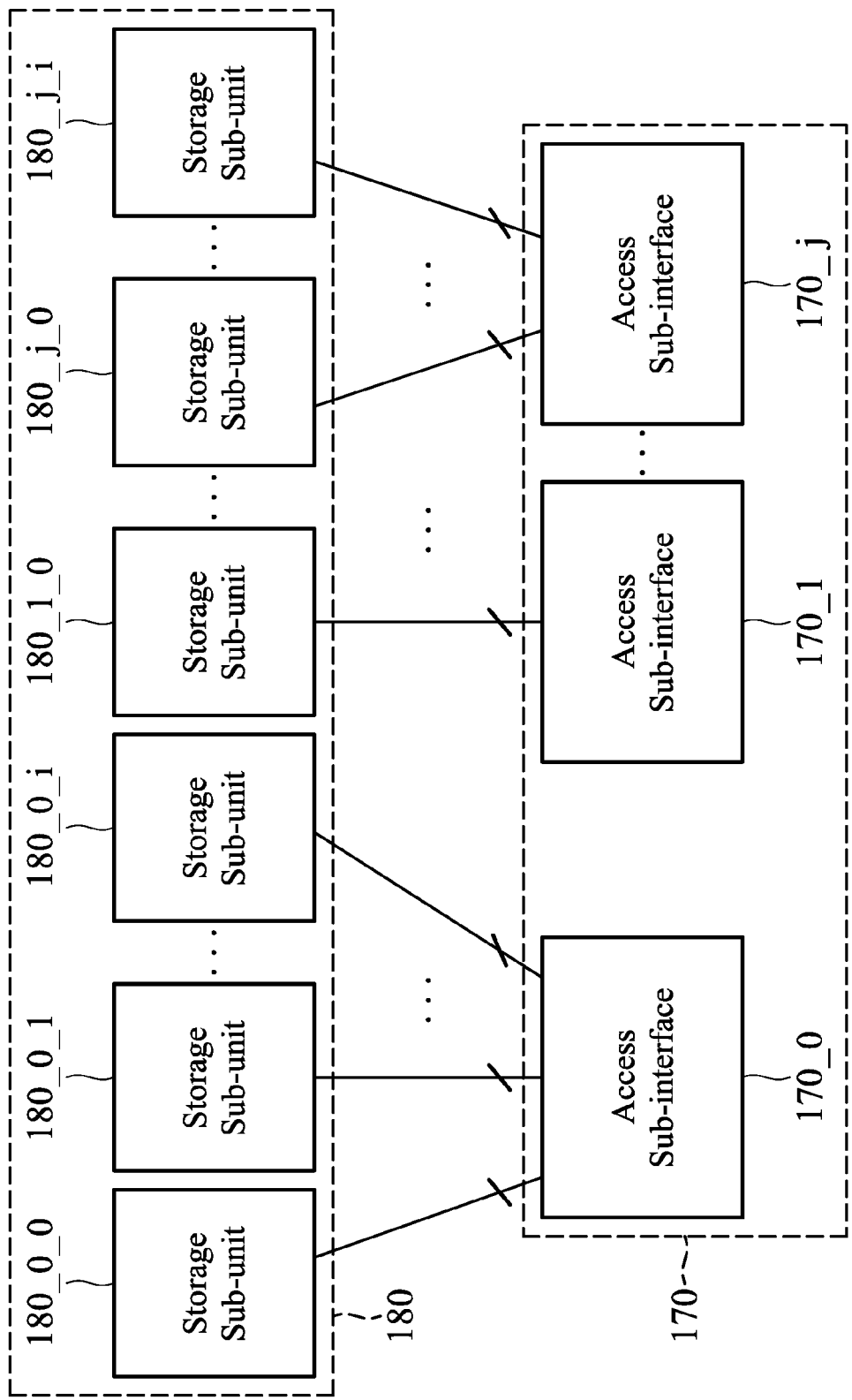
FIG. 2 is a schematic diagram illustrating interfaces to storage units of a flash storage according to an embodiment of the invention.
Figure 3:
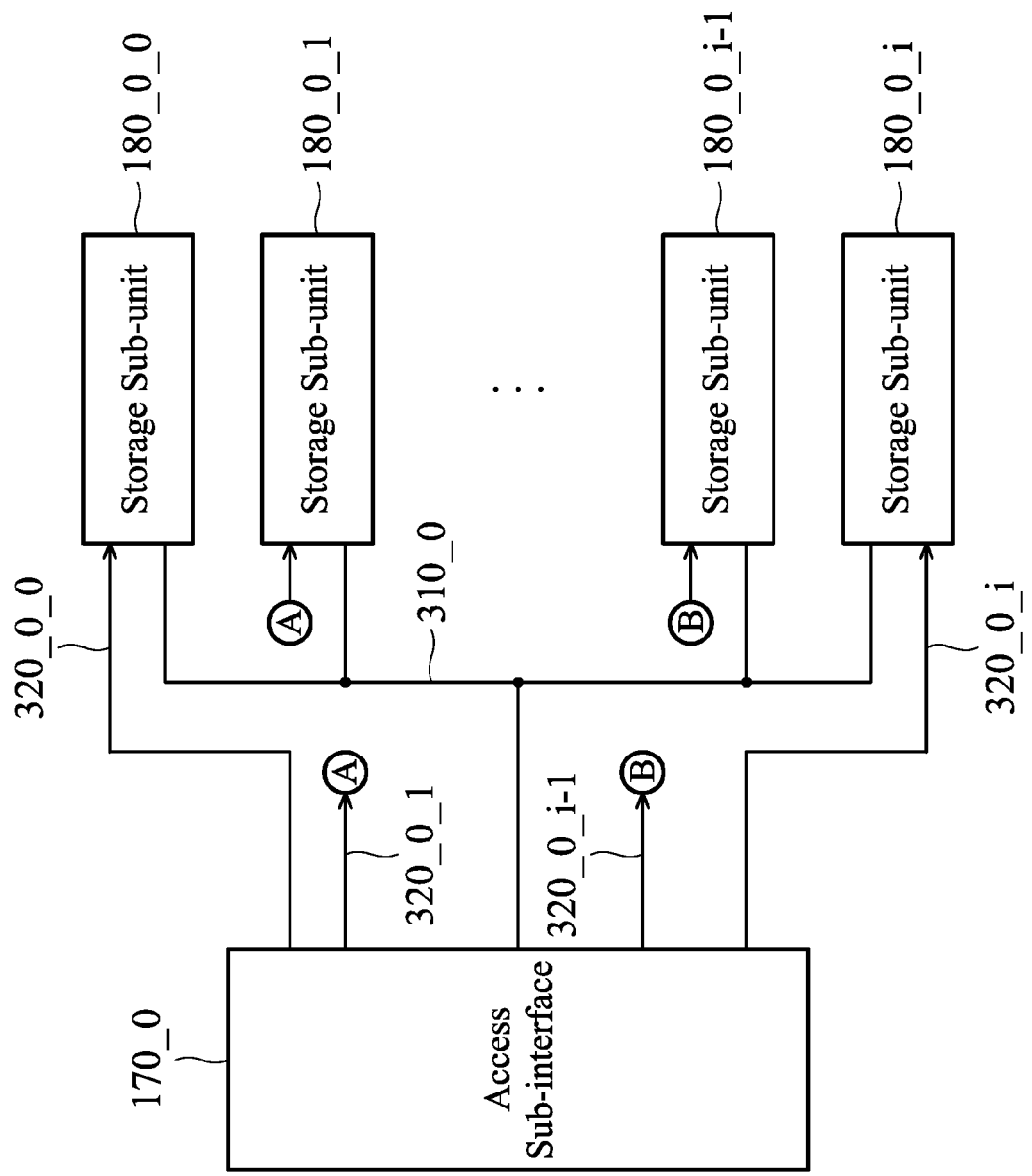
FIG. 3 is a schematic diagram depicting connections between one access sub-interface and multiple storage sub-units according to an embodiment of the invention.
Figure 4:
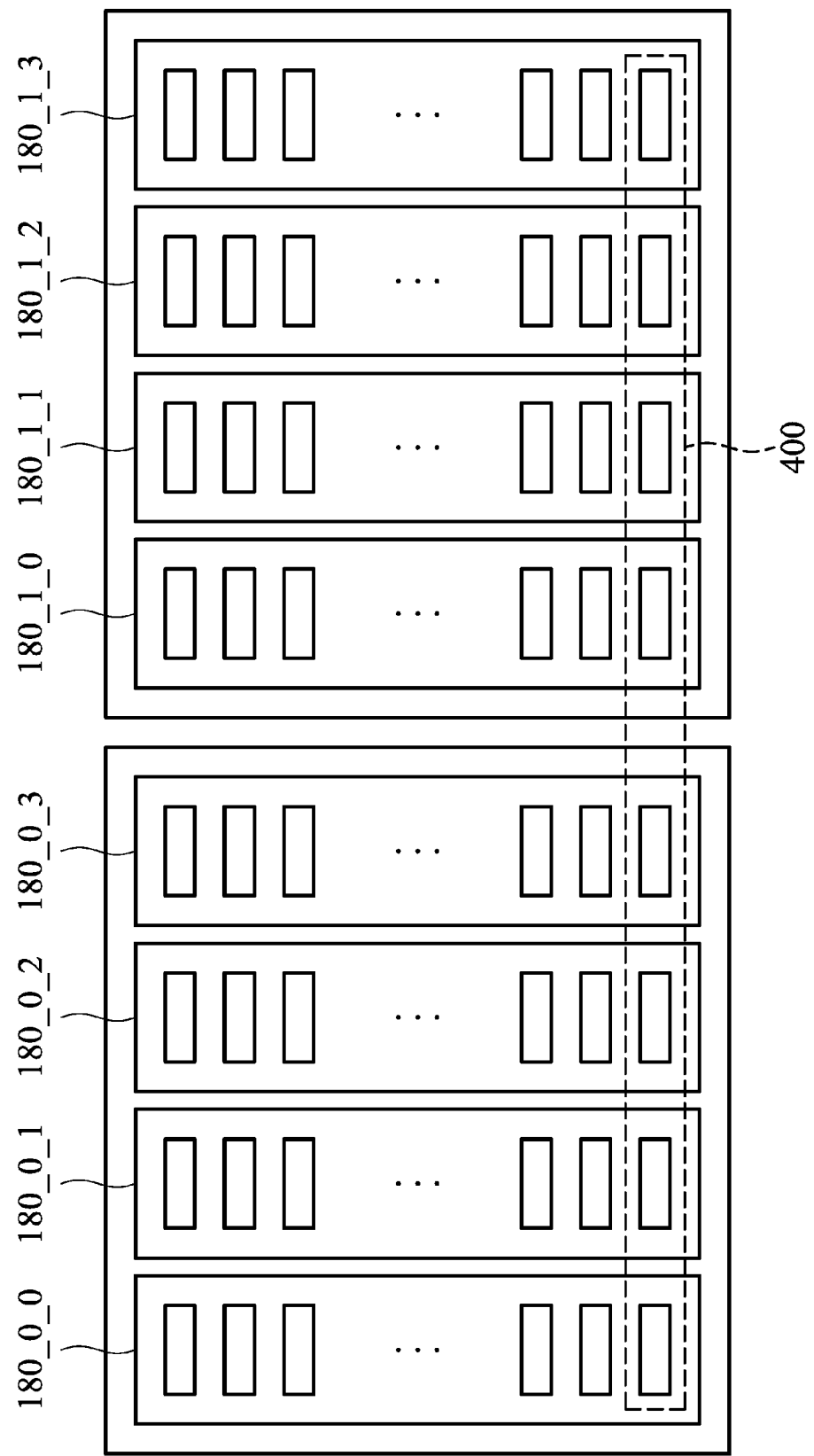
FIG. 4 is a schematic diagram illustrating a super page according to an embodiment of the invention.

The storage unit 180 may contain multiple storage sub-units and each storage sub-unit may be practiced in a single die and use a respective access sub-interface to communicate with the processing unit 110. FIG. 2 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_0 to 180_j_i in total. The processing unit 110 may direct one of the access sub-interfaces 170_0 to 170_j to read data from the designated storage sub-unit. Each storage sub-unit has an independent CE control signal. That is, it is required to enable a corresponding CE control signal when attempting to perform data read from a designated storage sub-unit via an associated access sub-interface. It is apparent that any number of channels may be provided in the flash memory 10, and each channel may be associated with any number of storage sub-units, and the invention should not be limited thereto. FIG. 3 is a schematic diagram depicting connections between one access sub-interface and multiple storage sub-units according to an embodiment of the invention. The processing unit 110, through the access sub-interface 170_0, may use independent CE control signals 320_0_0 to 320_0_i to select one of the connected storage sub-units 180_0_0 and 180_0_i, and then read data from the designated location of the selected storage sub-unit via the shared data line 310_0. FIG. 4 is a schematic diagram illustrating a super page according to an embodiment of the invention. Assume that the storage unit 180 contains 8 storage sub-units 180_0_0 to 180_1_3 and each storage sub-unit may be referred to as a data plane. Each data plane may store multiple pages of data and each page has a fixed length, such as 4K, 8K, 16K bytes, etc. Particular pages of the data planes collectively form a physical super page. For example, the physical super page 400 collects the pages 0 of the data planes 180_0_0 to 180_1_3.

Figure 5:
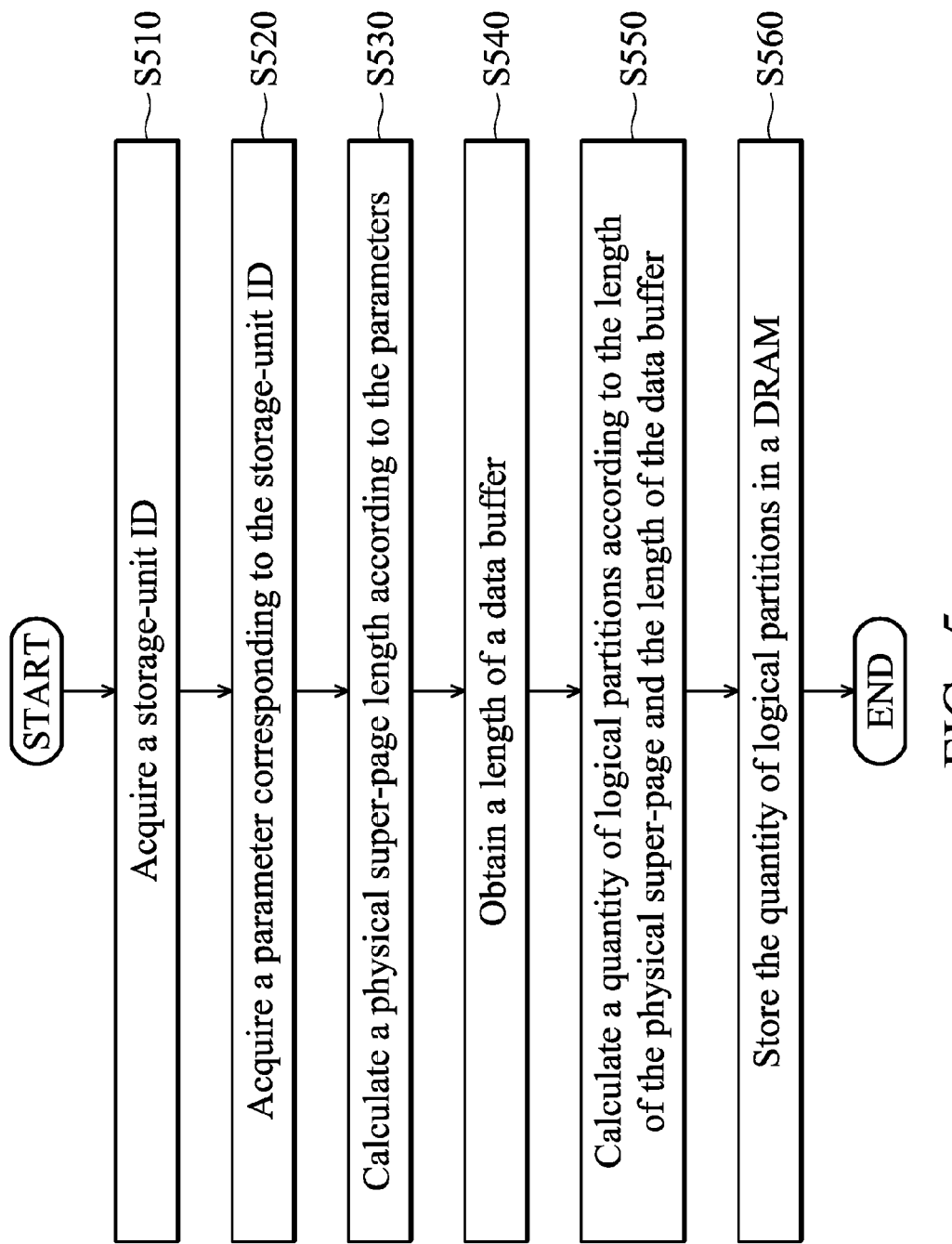
FIG. 5 is a flowchart illustrating a method for dynamic partitioning according to an embodiment of the invention.

Since the flash memory may dispose different types of storage units, after powering on, the flash memory needs to calculate the quantity of logical partitions according to the disposed type of the storage unit 180. FIG. 5 is a flowchart illustrating a method for dynamic partitioning according to an embodiment of the invention. The method is practiced when the processing unit 110 loads and executes relevant firmware. The process begins with an acquisition of a storage-unit ID (identifier) (step S510) and a parameter corresponding to the storage-unit ID (step S520). In step S510, the processing unit 110 may query the storage-unit ID to the storage unit 180 via the access interface 170. The storage-unit ID may be a flash ID in 6 bytes. In step S520, a ROM (Read Only Memory) 140 may store a look-up table and the look-up table stores multiple parameters corresponding to each storage-unit identifier. The parameters may include page length, quantity of storage sub-units, and quantity of data pages of each storage sub-unit. The processing unit 110 obtains the parameters corresponding to the storage-unit ID by searching the look-up table. Refer to Table 1 for an exemplary look-up table.

TABLE 1

| Storage-Unit ID | Page Length (KB) | Quantity of storage sub-units | Quantity of data pages of each storage sub-unit |
|---|---|---|---|
| 1 | 8 | 2 | 4 |
| 2 | 16 | 2 | 2 |
| 3 | 16 | 1 | 4 |
| 4 | 8 | 1 | 3 |

Figure 6:
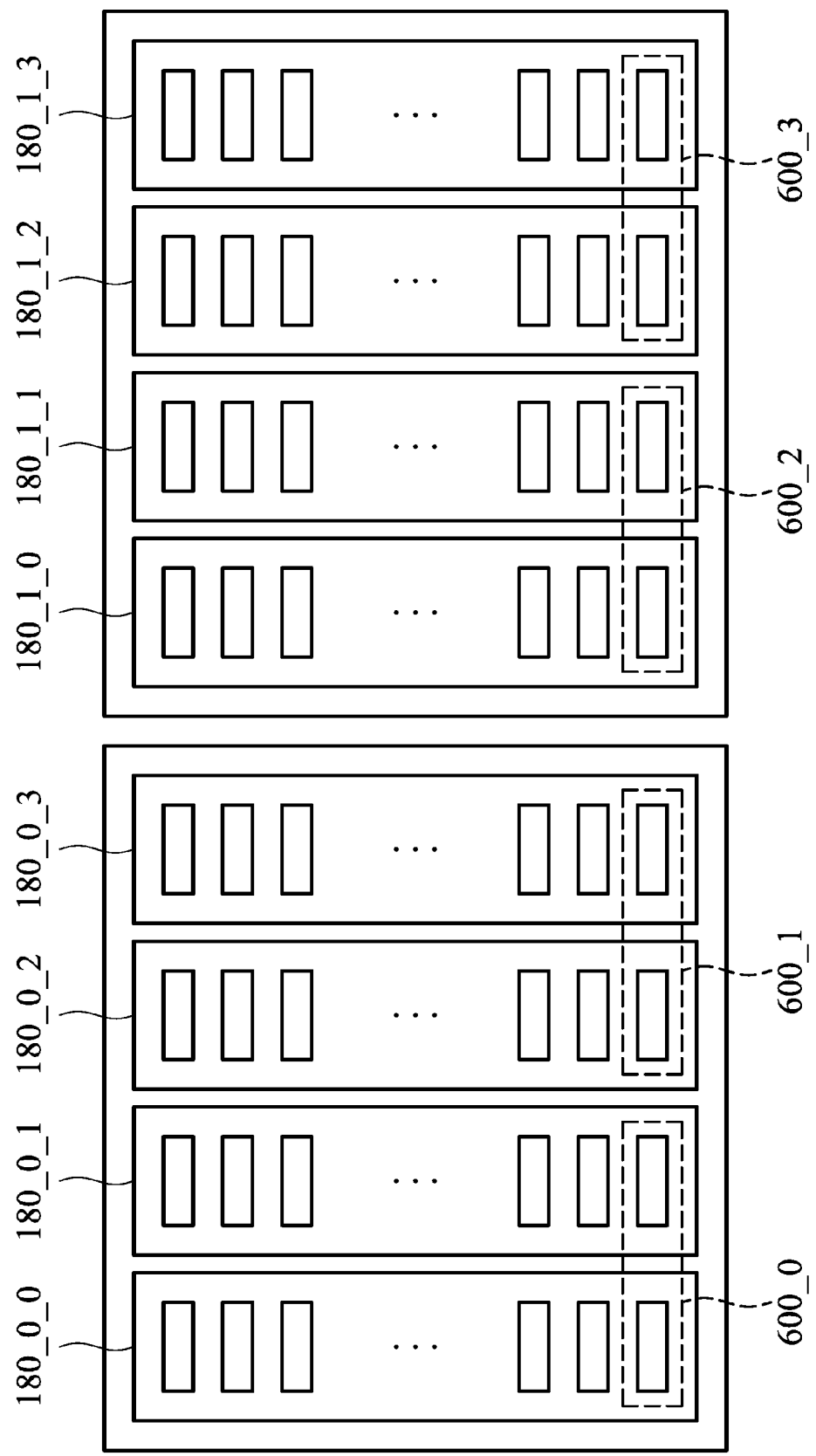
FIG. 6 is a schematic diagram illustrating logical partitions according to an embodiment of the invention.

Subsequently, the physical super-page length is calculated according to the parameters (step S530). The processing unit 110 may calculate the physical super-page length by using the Equation:

$$\alpha = p * q * r \quad (1)$$

where α indicates the physical super-page length, p indicates a page length, q indicates a quantity of the storage sub-units and r indicates a quantity of data pages of each storage sub-unit. In addition, the length of the data buffer 120 is obtained (step S540). The quantity of logical partitions is calculated according to the length of the physical super-page and the length of the data buffer 120 (step S550). The processing unit 110 may calculate the quantity of logical partitions by using the Equation:

$$N_p = \alpha / \gcd(\alpha, \beta) \quad (2)$$

where $N_p$ indicates the quantity of logical partitions, gcd(α, β) indicates the function of greatest common divisor, α indicates the physical super-page length and β indicates the length of the data buffer 120. Finally, the quantity of logical partitions is stored in the DRAM (Dynamic Random Access Memory) 130 (step S560). Assume that the length of the data buffer 120 is 16K Bytes: For example, the length of the physical super-page corresponding to the storage sub-unit ID being 1 is 64K Bytes according to Table 1, and the calculated quantity of logical partitions is 4 (=64/gcd(64, 16)). FIG. 6 is a schematic diagram illustrating logical partitions according to an embodiment of the invention. According to the calculated results, one physical super-page can be divided into 4 logical partitions. For example, the pages 0 of the storage sub-units 180_0_0 and 180_0_1 form the $0^{th}$ logical partition 600_0, the pages 0 of the storage sub-units 180_0_2 and 180_0_3 form the $1^{st}$ logical partition 600_1, and the following can be deduced by the analogy.

Table 2 illustrates the dividing results for the calculated quantity of logical partitions using Equations (1) and (2).

TABLE 2

| Storage-Unit ID | Page Length (KB) | Quantity of logical partitions | Quantity of pages of one logical partition | Length of one logical partition (KB) |
|---|---|---|---|---|
| 1 | 8 | 2 | 4 | 32 |
| 2 | 16 | 2 | 2 | 32 |
| 3 | 16 | 4 | 4 | 64 |
| 4 | 8 | 3 | 3 | 24 |

Figure 7:
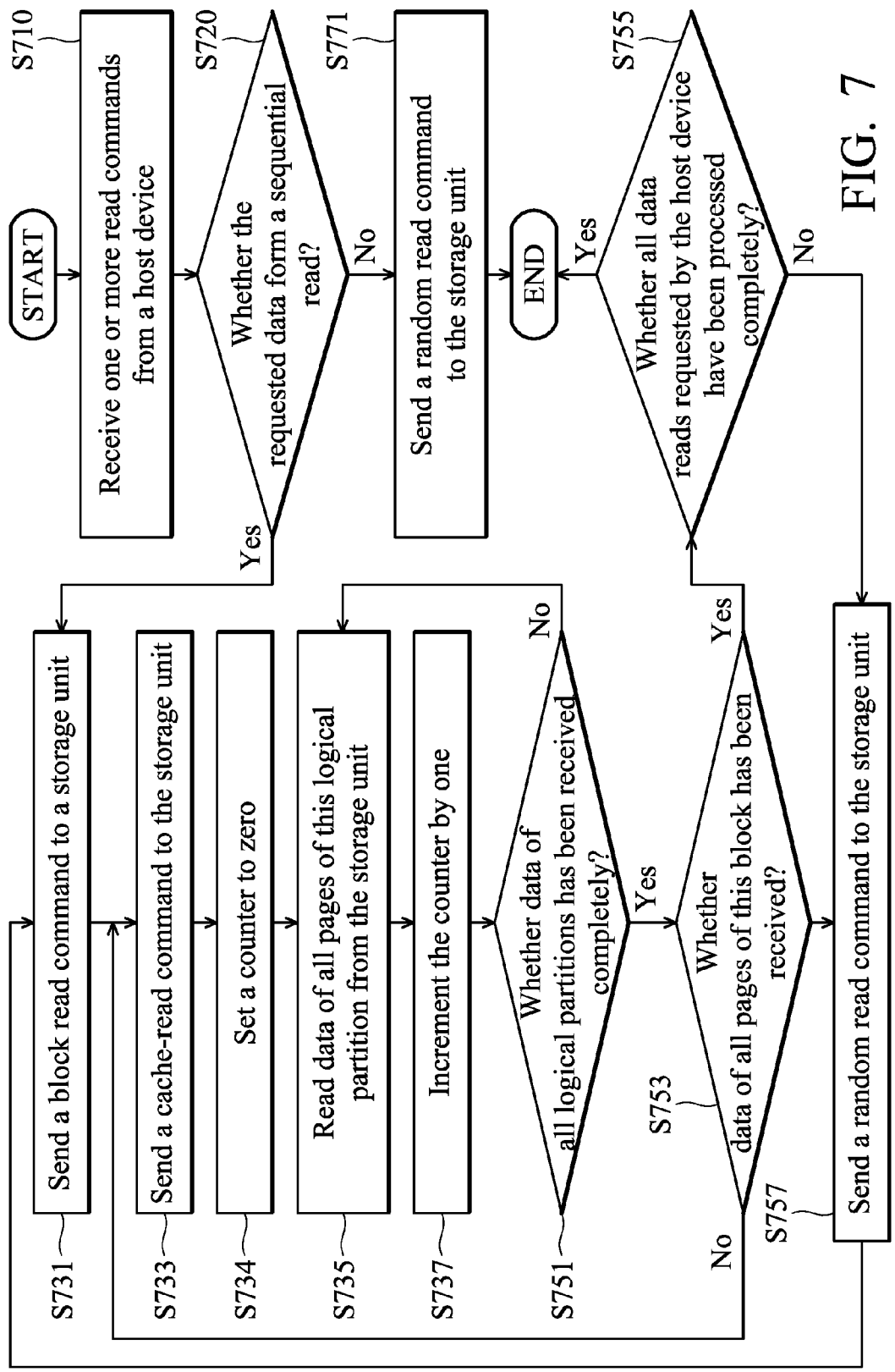
FIG. 7 is a flowchart illustrating a method of data read according to an embodiment of the invention.

The calculated quantity of logical partitions may be used in the forthcoming data read operation. FIG. 7 is a flowchart illustrating a method of data read according to an embodiment of the invention. The method is performed by the processing unit 110 when loading and executing relevant firmware. After receiving one or more read commands from the host device 160 (step S710), it is determined whether the requested data form a sequential read (step S720). Otherwise, a random read command is sent to the storage unit 180 via the access interface 170 for reading data of a particular logical block address (step S771). If so, a sequential read procedure is performed to read successive data by using compact read commands (steps S731 to S757).

In the sequential read procedure, the processing unit 110 sends a block read command to the storage unit 180 via the access interface 170 to inform that the following read commands are used for reading data of a particular block (step S731). Next, a cache-read loop is repeatedly executed to read all data of the designated block (steps S733 to S753). In each iteration, the processing unit 110 sends a cache-read command to the storage unit 180 for reading data of the $0^{th}$ or the next logical partition (step S733) and sets a counter to zero (step S734). In step S733, one cache-read command can be used to read data of all relevant pages of one logical partition, for example, data of all pages 0 of the logical partition 0. It should be noted that the cache-read command omits information regarding which blocks will be read. Subsequently, the processing unit 110 reads data of all pages of this logical partition from the storage unit 180 via the access interface 170 (step S735), increases the counter by an increment of one (step S737) and determines whether data of all logical partitions has been received completely (step S751). If so, it is determined whether data of all pages of this block has been received (step S753). Otherwise, data of all pages of the next logical partition is read from the storage unit 180 via the access interface 170 (step S735). In step S735, specifically, the processing unit 110 reads the quantity of logical partitions of the DRAM 130 and determines whether the counter equals the quantity of logical partitions multiplying by the quantity of pages of one data plane. If so, it is determined that data of all pages of this block has been received completely. When data of all pages of this block has been received completely (the "Yes" path of step S753), it is further determined whether all data reads requested by the host device 160 have been processed completely (step S755). Moreover, when data of all pages of this block has not been received completely (the "No" path of step S753), a cache-read command for reading data of all relevant pages of the next logical partition is sent via the access interface 170 (step S733). When all data reads requested by the host device 160 have been processed completely (the "Yes" path of step S755), the whole process ends. When all data reads requested by the host device 160 have not been processed completely (the "No" path of step S755), an EOC (end of cache-read) command is sent to the storage unit 180 via the access interface 170 (step S757), and then, a block read command is sent to the storage unit 180 via the access interface 170 to inform the storage unit 180 that the following read commands are used for reading data of the next block (step S731).

FIG. 8 is a schematic diagram for sequential reads across blocks according to an embodiment of the invention. Assume each data plane has 256 pages and the data planes of the storage unit 180 can be divided into four logical partitions: When the counter reaches 1024 (the "Yes" path of step S753) and all read commands issued by the host device 160 have not been processed completely (the "No" path of step S755), an EOC command is sent to the storage unit 180 via the access interface 170 (step S757), and then a block read command is sent to the storage unit 180 via the access interface 170 to inform that the following read commands are used for reading data of the block 830 (step S731).

Although the embodiment has been described as having specific elements in FIG. 1, it should be noted that additional elements may be included to achieve better performance without departing from the spirit of the invention. While the process flows described in FIGS. 5 and 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamic partitioning, performed by a processing unit, comprising:
   acquiring a storage-unit ID (identifier) associated with a storage unit, wherein the storage unit is coupled to the processing unit;
   obtaining a plurality of parameters corresponding to the storage-unit ID;
   calculating a length of a physical super-page according to the parameters;
   obtaining a length of a data buffer;
   calculating a quantity of logical partitions according to the length of the physical super-page and the length of the data buffer; and
   storing the quantity of logical partitions in a DRAM (Dynamic Random Access Memory).

2. The method of claim 1, wherein the step for acquiring a storage-unit ID associated with a storage unit further comprises:
   querying the storage-unit ID to the storage unit via an access interface.

3. The method of claim 1, wherein the step for obtaining a plurality of parameters corresponding to the storage-unit ID further comprises:
   searching a lookup table of a ROM (Read Only Memory) to obtain a page length, a quantity of storage sub-units and a quantity of data pages of each storage sub-unit.

4. The method of claim 3, wherein the length of the physical super-page is calculated by using an Equation:

$$\alpha = p*q*r,$$

wherein α indicates the length of the physical super-page length, p indicates the page length, q indicates the quantity of the storage sub-units and r indicates the quantity of data pages of each storage sub-unit.

5. The method of claim 4, wherein the quantity of logical partitions is calculated by using an Equation:

$$N_p = \alpha/\gcd(\alpha,\beta),$$

wherein $N_p$ indicates the quantity of logical partitions, $\gcd(\alpha,\beta)$ indicates a function of greatest common divisor for parameters α and β, α indicates the length of the physical super-page and β indicates the length of the data buffer.

6. The method of claim 1, further comprising:
in a sequential read procedure, determining whether data of all pages of a block has been received completely and all data reads have not been processed completely; and
if so, sending an EOC (end of cache-read) command to the storage unit via an access interface and sending a block read command to the storage unit via the access interface to inform that the following read commands are used for reading data of the next block.

7. The method of claim 6, further comprising:
in the sequential read procedure, after reading data of all pages of a logical partition of the block, increasing a counter by one.

8. The method of claim 7, wherein the step for determining whether data of all pages of a block has been received completely further comprises:
reading the quantity of logical partitions of the DRAM;
determining whether the counter equals the quantity of logical partitions multiplied by a quantity of pages of one data plane; and
if so, determining that data of all pages of the block has been received completely.

9. The method of claim 6, further comprising:
otherwise, sending a cache-read command for reading data of all pages of the next logical partition to the storage unit via the access interface.

10. An apparatus for dynamic partitioning, performed by a processing unit, comprising:
an access interface, coupled to a storage unit;
a processing unit, acquiring a storage-unit ID (identifier) associated with the storage unit via the access interface, wherein the storage unit is coupled to the processing unit; obtaining a plurality of parameters corresponding to the storage-unit ID; calculating a length of a physical super-page according to the parameters; obtaining a length of a data buffer; calculating a quantity of logical partitions according to the length of the physical super-page and the length of the data buffer; and storing the quantity of logical partitions in a DRAM (Dynamic Random Access Memory).

11. The apparatus of claim 10, wherein the processing unit queries the storage-unit ID to the storage unit via an access interface.

12. The apparatus of claim 10, wherein the processing unit searches a lookup table of a ROM (Read Only Memory) to obtain a page length, a quantity of storage sub-units and a quantity of data pages of each storage sub-unit.

13. The apparatus of claim 12, wherein the length of the physical super-page is calculated by using an Equation:

$$\alpha = p*q*r,$$

wherein α indicates the length of the physical super-page length, p indicates the page length, q indicates the quantity of the storage sub-units and r indicates the quantity of data pages of each storage sub-unit.

14. The apparatus of claim 13, wherein the quantity of logical partitions is calculated by using an Equation:

$$N_p = \alpha/\gcd(\alpha,\beta),$$

wherein $N_p$ indicates the quantity of logical partitions, $\gcd(\alpha,\beta)$ indicates a function of greatest common divisor for parameters α and β, α indicates the length of the physical super-page and β indicates the length of the data buffer.

15. The apparatus of claim 10, wherein the processing unit, in a sequential read procedure, determines whether data of all pages of a block has been received completely and all data reads have not been processed completely; and if so, sends an EOC (end of cache-read) command to the storage unit via the access interface and sends a block read command to the storage unit via the access interface to inform that the following read commands are used for reading data of the next block.

16. The apparatus of claim 15, wherein, in the sequential read procedure, the processing unit increases a counter by an increment of one after reading data of all pages of a logical partition of the block.

17. The apparatus of claim 16, wherein the processing unit reads the quantity of logical partitions of the DRAM; determines whether the counter equals the quantity of logical partitions multiplied by a quantity of pages of one data plane; and if so, determines that data of all pages of the block has been received completely.

18. The apparatus of claim 15, wherein, otherwise, the processing unit sends a cache-read command for reading data of all pages of the next logical partition to the storage unit via the access interface.

* * * * *